(12) United States Patent
Strange et al.

(10) Patent No.: US 10,730,169 B2
(45) Date of Patent: Aug. 4, 2020

(54) TOOL APPARATUS INCLUDING BLIND BOLT AND INSTALLATION TOOL

(71) Applicant: Allfasteners USA, LLC, Medina, OH (US)

(72) Inventors: Michael Strange, Columbia Station, OH (US); Bruce A. Carmichael, Hinckley, OH (US)

(73) Assignee: Allfasteners USA, LLC, Medina, OH (US)

( * ) Notice: Subject to any disclaimer, the term of this patent is extended or adjusted under 35 U.S.C. 154(b) by 195 days.

(21) Appl. No.: 15/648,652

(22) Filed: Jul. 13, 2017

(65) Prior Publication Data

US 2019/0015959 A1    Jan. 17, 2019

(51) Int. Cl.
| | |
|---|---|
| *F16B 13/08* | (2006.01) |
| *H02G 1/08* | (2006.01) |
| *B25B 13/48* | (2006.01) |
| *F16B 5/02* | (2006.01) |
| *F16B 31/04* | (2006.01) |
| *F16B 31/02* | (2006.01) |
| *B25B 29/02* | (2006.01) |
| *F16B 43/00* | (2006.01) |
| *B25B 27/14* | (2006.01) |
| *F16B 35/04* | (2006.01) |
| *F16B 37/04* | (2006.01) |

(52) U.S. Cl.
CPC ............ *B25B 13/481* (2013.01); *B25B 27/14* (2013.01); *B25B 29/02* (2013.01); *F16B 5/02* (2013.01); *F16B 13/0808* (2013.01); *F16B 31/021* (2013.01); *F16B 31/043* (2013.01); *F16B 35/045* (2013.01); *F16B 37/041* (2013.01); *F16B 43/00* (2013.01)

(58) Field of Classification Search
CPC ......... H02G 1/081; B25B 13/481; F16L 1/06; F16B 13/0808
USPC ................................................ 254/134.3 FT
See application file for complete search history.

(56) References Cited

U.S. PATENT DOCUMENTS

| | | |
|---|---|---|
| 2,511,051 A | 6/1950 | Dzus |
| 2,632,354 A | 3/1953 | Black |
| (Continued) | | |

OTHER PUBLICATIONS

Zip-Fix—How to Tuesday—Quick & Easy Plasterboard Fixing https://www.youtube.com/watch?v=ErGh-jflboo (Year: 2017).*
(Continued)

*Primary Examiner* — Monica S Carter
*Assistant Examiner* — Mahdi H Nejad
(74) *Attorney, Agent, or Firm* — Luedeka Neely Group, P.C.

(57) ABSTRACT

An apparatus including a threaded member having a head, a shaft extending away from the head, threads disposed on at least a portion of the shaft, and a tip opposite the head. The head, tip, shaft, and threads are sized to pass through a hole in a structure such that the threaded member may be inserted into the structure. The apparatus further includes a tool for mounting to the threaded member that extends out of out the hole when the threaded member is located within the structure. The tool includes a connector that mounts to the tip of the threaded member and a flexible member that extends away from the connector and out of the hole when the threaded member is located within the structure.

12 Claims, 9 Drawing Sheets

(56) References Cited

U.S. PATENT DOCUMENTS

| | | | | |
|---|---|---|---|---|
| 3,110,478 | A | * | 11/1963 | Bostick .................. F16C 1/20 254/134.3 FT |
| 3,129,630 | A | | 4/1964 | Wing et al. |
| 3,211,042 | A | * | 10/1965 | Fischer ............... F16B 13/0808 411/344 |
| 3,400,627 | A | | 9/1968 | Raynovich, Jr. |
| 3,605,547 | A | * | 9/1971 | Millet ................. F16B 13/0808 411/344 |
| 3,789,705 | A | | 2/1974 | Naslund |
| 4,022,099 | A | | 5/1977 | Ballantyne |
| 4,286,497 | A | * | 9/1981 | Shamah .................. F16B 37/04 411/342 |
| 4,439,079 | A | * | 3/1984 | Losada ............... F16B 13/0808 24/16 PB |
| 4,573,844 | A | * | 3/1986 | Smith ................ F16B 13/0808 24/453 |
| 4,637,764 | A | | 1/1987 | Imai |
| 4,684,161 | A | * | 8/1987 | Egner .................. G02B 6/4439 254/134.3 FT |
| 4,776,089 | A | | 10/1988 | Schoenwetter et al. |
| 4,836,062 | A | | 6/1989 | LaTorre |
| 5,007,223 | A | * | 4/1991 | Holland ................. A47K 10/10 411/344 |
| 5,067,843 | A | * | 11/1991 | Nova ..................... F16G 11/00 254/134.3 FT |
| 5,651,639 | A | * | 7/1997 | Wentworth ......... F16L 55/1657 405/184 |
| 5,651,649 | A | | 7/1997 | Sadri et al. |
| 5,687,954 | A | * | 11/1997 | Schroeder ................ H02G 1/08 254/134.3 FT |
| 6,247,883 | B1 | | 6/2001 | Monserratt |
| 6,254,323 | B1 | | 7/2001 | Junkers |
| 7,204,667 | B2 | | 4/2007 | Uno et al. |
| 7,347,791 | B1 | | 3/2008 | Watkins et al. |
| 7,373,709 | B2 | * | 5/2008 | Fernando ................ B25B 13/48 29/243 |
| 7,828,501 | B2 | * | 11/2010 | Bauer ................ F16B 13/0808 411/258 |
| 7,905,069 | B1 | | 3/2011 | Lockwood |
| 8,037,788 | B2 | | 10/2011 | Proper |
| 8,517,650 | B2 | | 8/2013 | Niklewicz et al. |
| 8,555,481 | B2 | | 10/2013 | Porter et al. |
| 8,858,143 | B2 | * | 10/2014 | Gaudron ............. F16B 13/0808 411/344 |
| 2006/0027795 | A1 | * | 2/2006 | Crawford ............... H02G 1/081 254/134.3 FT |
| 2013/0156525 | A1 | | 6/2013 | Gill et al. |
| 2013/0221298 | A1 | * | 8/2013 | Bennett ................. H02G 1/081 254/134.3 FT |
| 2017/0321823 | A1 | * | 11/2017 | Curran ...................... F16L 1/06 |
| 2018/0051826 | A1 | * | 2/2018 | Park ....................... F16L 1/032 |
| 2019/0331147 | A1 | * | 10/2019 | McDuff ................ F16B 13/002 |

OTHER PUBLICATIONS

Installing Zip-Toggle Anchors into hollow walls—General installations & Professional Sign Standoffshttps://www.youtube.com/watch?v=r2r44N5tvR8 (Year: 2012).*

AF Tower NexGen2 Blind Bolt found at: https://www.youtube.com/watch?v=yVgyulyBx5M (Year: 2018).*

* cited by examiner

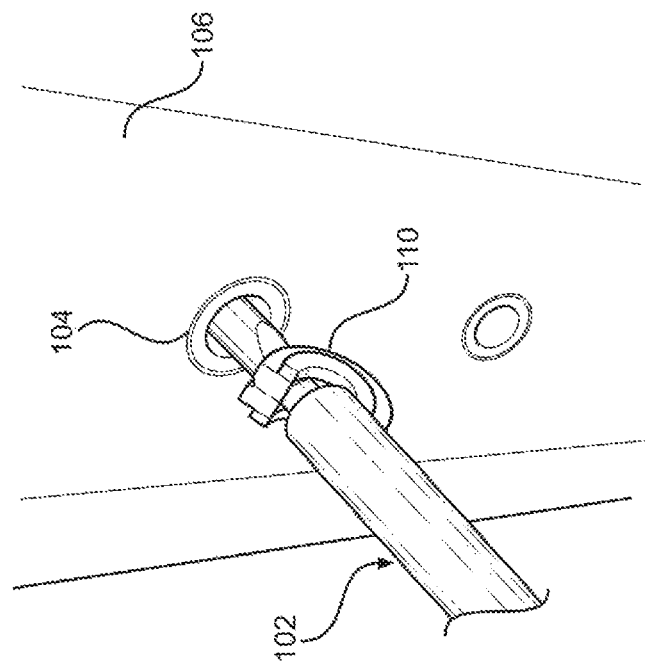
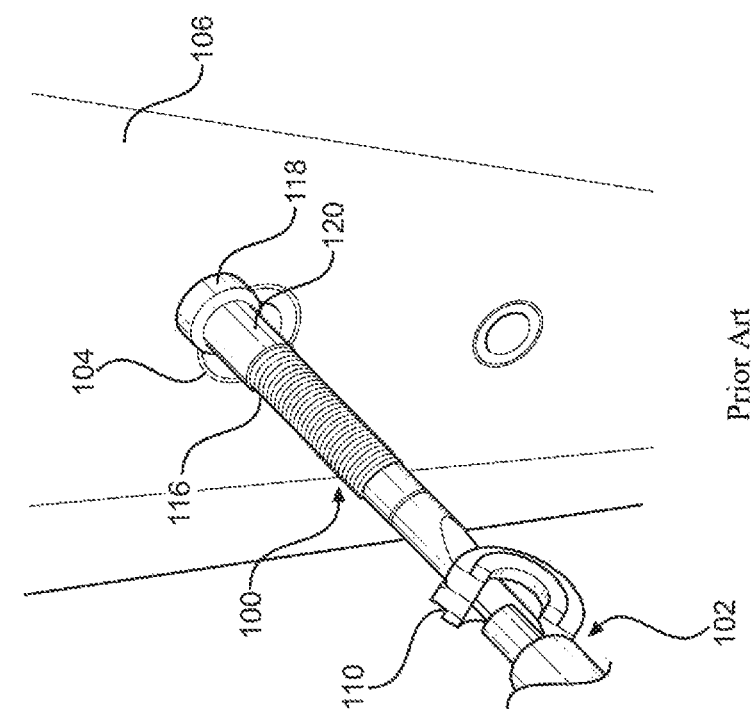

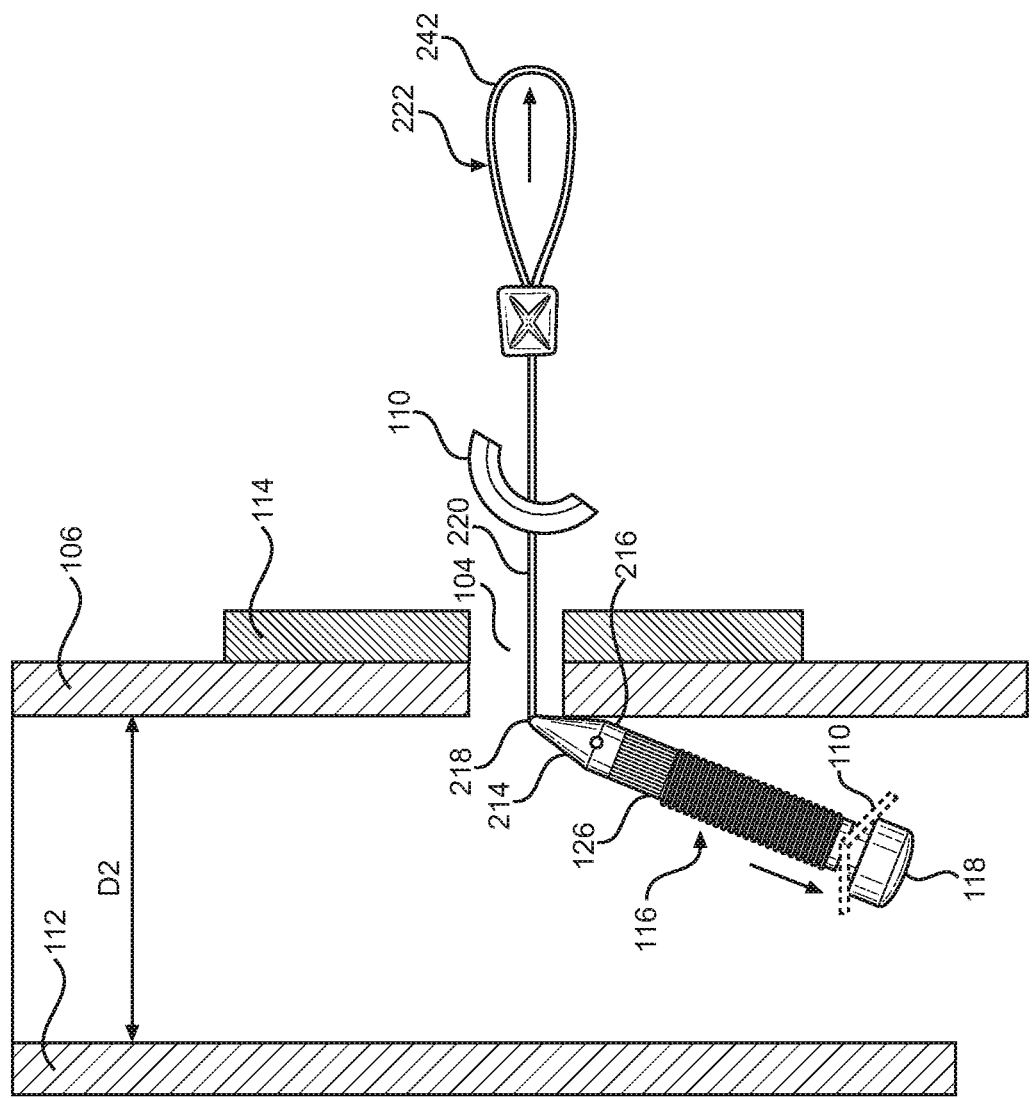

TOOL APPARATUS INCLUDING BLIND BOLT AND INSTALLATION TOOL

FIELD OF THE INVENTION

This invention relates to the field of fasteners and fastener installation tools more particularly, this invention relates to blind bolts and installation tools for installing blind bolts in restricted access environments.

BACKGROUND

Large construction structures often need to be scaled for various purposes. For example, large towers are often scaled to change or improve equipment, modify or reinforce the structure of the tower, and maintain the tower. In one particular type of tower, the cell phone tower, new innovations and increased demands have created a need to add additional weight to the cell phone tower. Often, it is necessary or desirable to reinforce the cell phone tower to accommodate the additional weight. One technique for reinforcement uses blind bolts. Typically, the blind bolt is used for reinforcing the structure with reinforcement plates mounted to the exterior of the tower or to add additional equipment to the original tower. Of course, blind bolts may be used for a variety of different purposes on a variety of different structures.

A traditional method for installing a reinforcement plate onto a tower using a blind bolt and installation tool is illustrated in FIGS. 1-3. As shown, a blind bolt 100 is mounted onto an insertion tool 102 and is inserted into a hole 104 provided in a reinforcement plate 114 and structure 106.

The blind bolt 100 includes a threaded member 116 and a number of bolt components that are placed onto the threaded member, namely a folding washer 110, a non-folding washer 136, and a nut 138. The threaded member 116 has a head 118, a shaft 120 extending away from the head. During the installation process, the head 118 of the threaded member 116 is inserted into the hole 104 in the structure 106, and is located in an inaccessible area within the structure. Some blind bolts 100 may have an expanding structure that, when positioned at the far end of the threaded member adjacent the bolt head, expands and prevents the bolt from sliding back through the hole 104. For example, in this case, the folding washer 110 is inserted through the hole 104 in a folded configuration. Once positioned on the other side of the hole 104, the folding washer 110 is unfolded and is positioned adjacent the bolt head 118. To correctly position and unfold the folding washer 110 within the structure 106, a portion of the tool 102 required to manipulate the washer is also temporarily located within the inaccessible area of the structure. Once the washer 110 is unfolded, pulling the tool 102 causes the unfolded folding washer 110 to contact an inner surface surrounding the hole 104 in the structure 106 and also to contact the bolt head 108. As a result of this contact by the folding washer 110, the bolt head will not pass back through the hole 104 in the structure 106. Thus, the far end of the threaded member 116 may be secured within the structure 106. Once the far end of the threaded member is secured, the non-folding washer 136 slides onto the threaded member and contacts an outer surface surrounding the hole 104 outside of the structure 106. Lastly, the nut 138 is secured on the threaded portion 124 adjacent the non-folding washer 136 to hold the blind bolt 100 in place in the hole. Thus, using the method discussed above, the reinforcement plate 114 may be securely mounted to the exterior of a structure 106 in order to accommodate additional weight that must be supported by the structure.

The apparatus and process described above is effective for installing a blind bolt 100 on a structure 106 in most situations. The structure shown in FIG. 3 has an internal space D1 that is sufficiently large enough to receive the threaded member 116 and a portion of the tool 102 to enable manipulation of the folding washer 110 and the correct installation of the blind bolt 100 to the structure 106. However, in certain situations, using the apparatus and process above may be difficult. For example, FIG. 4 illustrates a structure 106 having reduced internal space D2 (where D2 is smaller than D1) caused by an obstruction 112. In one example, in the case of a small-sized structure, the obstruction 112 is the wall of the structure opposite from the hole 104. In another example, the obstruction 112 may be pipes, equipment, utility lines, etc. that are located within the structure 106. In general, the obstruction 112 is anything that prevents the tool 102 from being inserted into the hole 104 sufficiently far to manipulate the threaded member 116 or the folding washer 110, as described above. Thus, the obstruction 112 can prevent the blind bolt 100 from being correctly positioned within or mounted to the structure 106.

What is needed, therefore, is an installation tool and method for installing a blind bolt into a structure having an obstruction that overcomes the issues above.

SUMMARY

The above and other needs are met by a threaded member and tool apparatus for use in inserting the threaded member into a hole in a structure. The apparatus includes a threaded member having a head, a shaft extending away from the head, threads disposed on at least a portion of the shaft, and a tip opposite the head. The head, tip, shaft, and threads are sized to pass through the hole such that the threaded member may be inserted into the structure. The apparatus further includes an installation tool for removably mounting to the threaded member and for extending out of out the hole when the threaded member is located within the structure. The tool includes a connector having a first end configured to removably mount to the tip of the threaded member and a second end opposite the first end. The tool also includes a flexible member having an end. The flexible member extends from the second end of the connector and is sized to extend out of the hole when the connector is mounted to the threaded member and the threaded member is located within the structure, which enables a user to grasp the end of the flexible member.

In certain cases, threads are located on the tip of the threaded member and on the first end of the connector that are configured to mesh with the threads on the tip of the threaded member to removably mount the connector to the threaded member. In some cases, the first end of the connector may have an internally-threaded receiver and the tip of the threaded member is sized to fit within the receiver and has external threads configured to mesh with the internally-threaded receiver. Additionally, a splined section may be located between the external threads on the tip of the threaded member and the threads on the shaft of the threaded member, wherein the splined section and tip are configured to break away from the threaded shaft when a pre-set amount of torque is applied to the splined section. In other cases, the tip of the threaded member has an internally-threaded bore and the first end of the connector has an externally-threaded section that is sized to fit within the bore such that the threads within the bore mesh with the threads of the connector. Splines may be located on the tip of the threaded member.

In certain cases, a loop is formed in the end of the flexible member, wherein the loop is larger than the hole in the structure and the flexible member is sufficiently stiff that the loop is configured to contact the structure, to retain its shape and to prevent the end of the flexible member from passing into the structure via the hole. The apparatus may additionally include or more bolt components. Each bolt component has an opening and the loop may be reduced in size and inserted through the opening in the one or more bolt components and then increased in size to retain the bolt components on the flexible member.

The apparatus may include a folding washer configured to slide along the flexible member and into the hole in a folded configuration. The second end of the connector includes a tapered section that is tapered away from the first end that engages an opening formed in the folding washer such that the folding washer is opened to an unfolded configuration as it slides along the tapered section of the connector. In certain embodiments, the tapered section of the connector is conical or rounded in shape.

In certain cases, a first bore is formed in the second end of the connector and extends at least partially into the connector along an axis formed between the first end and the second end thereof. A portion of the flexible member opposite the end may be inserted into and fixedly mounted within the first bore. A second threaded bore may be formed in the connector between the first and second ends and arranged and configured such that the second bore is in communication with the first bore. A set screw may be threaded into the second bore until it contacts the portion of the flexible member disposed in the first bore for securely fixing the flexible member within the connector.

In certain cases, a handle is removably mounted to the end of the flexible member. The handle is larger than the hole in the structure and is configured to contact the structure surrounding the hole to prevent the end of the flexible member from passing into the structure via the hole.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIGS. 1 and 2 are perspective views illustrating steps for inserting a blind bolt into a structure using a rigid installation tool;

FIGS. 8 and 9 illustrate the process of using the blind bolt and tool apparatus of FIG. 5 to position a blind bolt into a hole having an obstruction;

DETAILED DESCRIPTION

Figure 3:
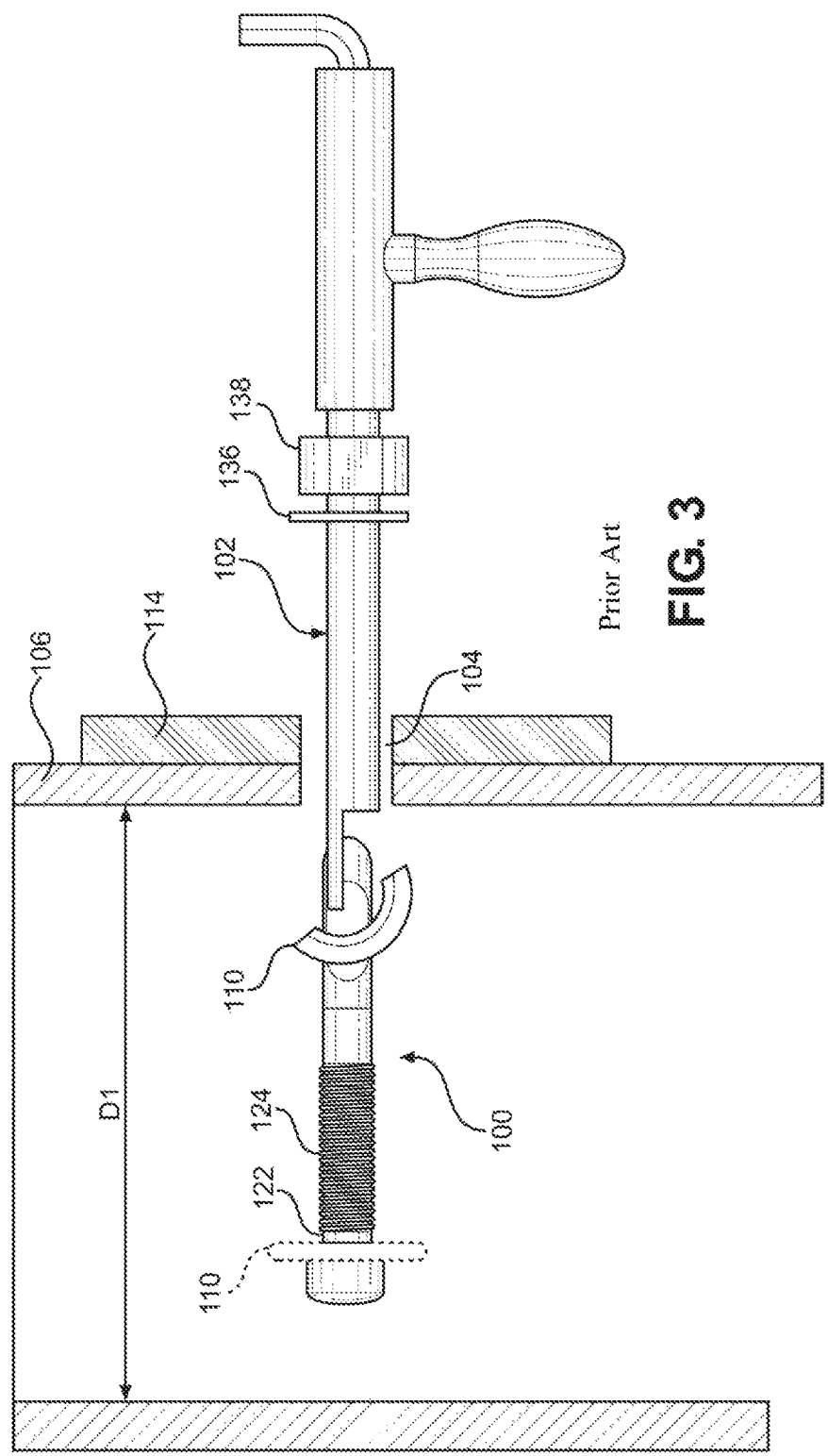
FIG. 3 is an elevation view illustrating a blind bolt mounted to a rigid installation tool, where the blind bolt and a portion of the tool have been inserted into the structure.
Figure 4:
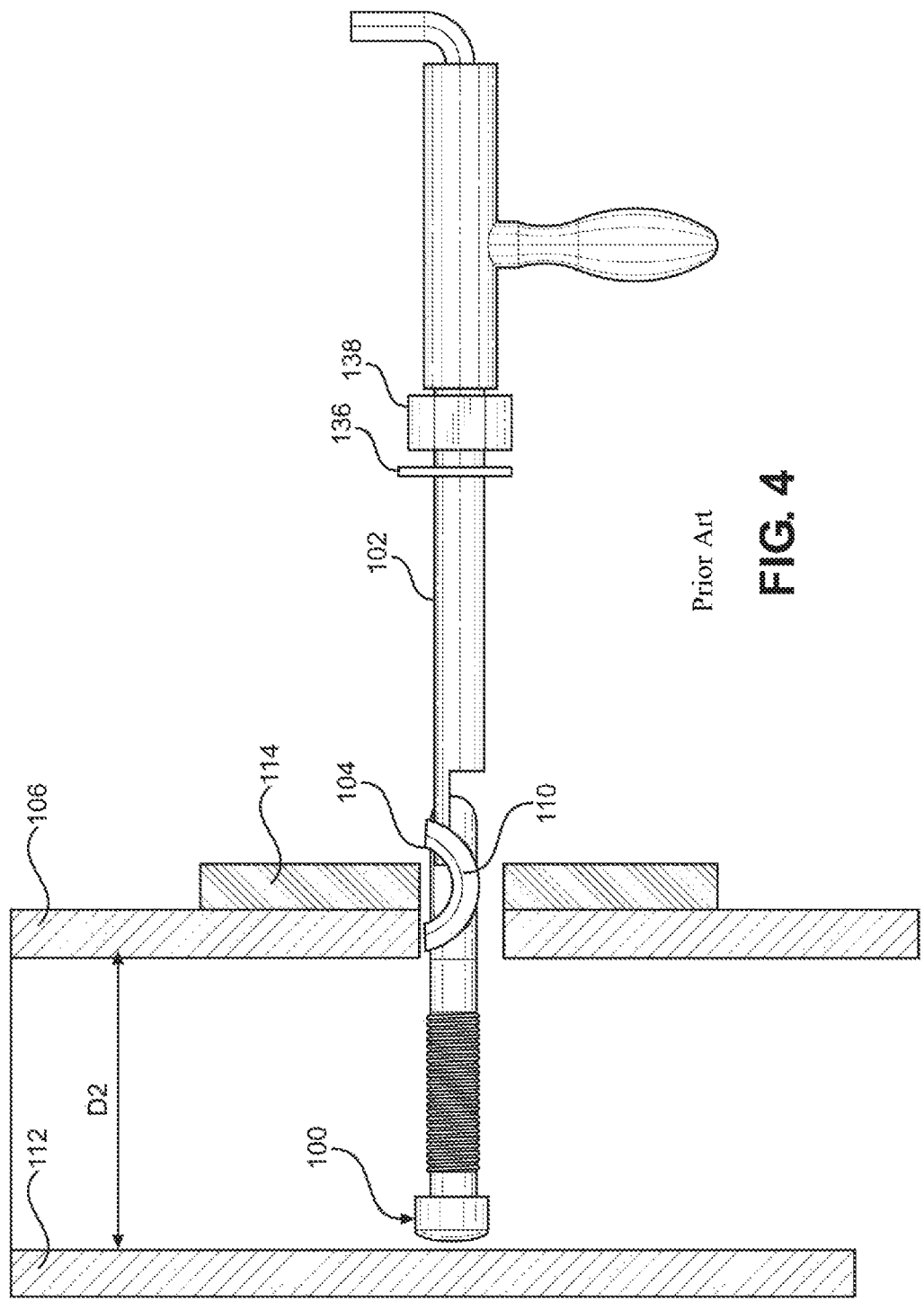
FIG. 4 is an elevation view illustrating a blind bolt mounted to a rigid installation tool, where an obstruction prevents the blind bolt and the tool from being inserted into the structure sufficiently far.
Figure 5:
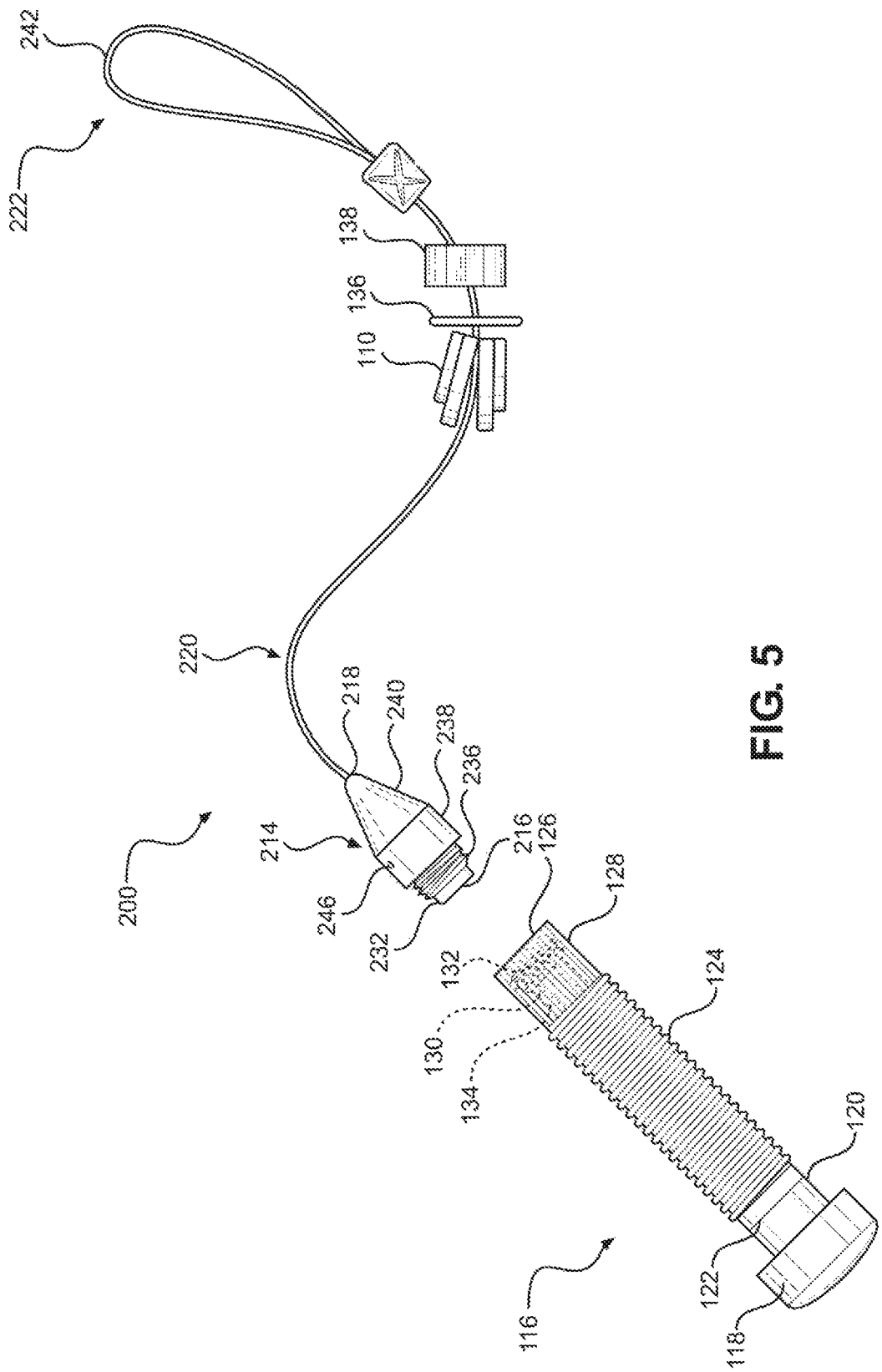
FIG. 5 illustrates a blind bolt and flexible tool apparatus for use in inserting the blind bolt into a hole in a structure according to a first embodiment of the present disclosure.

Referring now to FIG. 5, there is shown a threaded member 116 of a blind bolt. As mentioned previously, a folding washer 110 is located on the flexible tool apparatus in a folded configuration and a non-folding washer 136 and nut 138 are also located on the flexible tool apparatus. The shaft 120 of the threaded member 116 includes a smooth section 122 located adjacent the head 118 and a threaded section 124 disposed on at least a portion of the shaft. A tip 126 is located opposite the head 118 of the threaded member 116. Near the tip 126 of the threaded member 116, the threads 124 stop and the shaft 120 transitions into a smooth cylindrical surface 128. The head 118, shaft 120, threads 124, and tip 126 are sized to pass through a hole formed in a structure, which enables the entire threaded member to be passed through the hole and into the structure. A receiver 130 is formed in the tip end 126 and includes an outward end (i.e., nearer the tip 126) that is threaded with inner threads 132. The inward end (i.e., nearer the head 118) of the receiver 130 is a socket 134. In certain embodiments, the socket 134 is round. In other embodiments, the socket 134 is a hexagon socket having a width from flat to flat of 0.375 inches. The depth of the receiver 130, as shown, is 0.590 inches, and the threads 132 are ½ inch-13 threads per inch UNC. In some embodiments, the receive 130 does not include a socket and is, instead, fully threaded.

Also shown in FIG. 5 is a flexible tool apparatus 200 for use in inserting the threaded member 116 into a hole in a structure where only one side of the hole is accessible. The tool 200 is mounted to the tip 126 of the threaded member 116 and is then used to insert the threaded member into a hole in a structure. With the threaded member 116 located within the structure, the folding washer 110 is placed onto the tool 200. The folding washer 110 is then moved along the tool and then through the hole and into the structure, where it is unfolded and correctly positioned on the threaded member 116, in part, by a portion of the tool 200 located inside the structure while another portion of the tool is held outside the structure. The folding washer 110 prevents the head 118 of the threaded member 116 from being pulled back through the hole. The tip 126 of the threaded member 116 extends out of the hole and the remaining bolt components may then be placed onto the threaded member to install the blind bolt onto the structure. More particularly, the installation tool 200 includes a connector 214 having one end that is mounted to the tip 126 of the threaded member 116 and an opposite end that is mounted to a flexible member 220. The flexibility of this installation tool 200, provided by the flexible member 220, combined with a connector 214 that is relatively short in length (when compared to the rigid tool 102 discussed above), enable its use for installing threaded members in restricted access environments, such as small diameter structures or structures having internal obstructions.

The connector 214 has a first end 216 that is configured to mount to the threaded member 116 and a second end 218 opposite the first end that is configured to mount to the flexible member 220. An insertion guide 232 is formed on the first end 216 of the connector 214, and includes a slightly rounded or sloped tip that helps guide the connector 214 into the receiver 130 of the threaded member 116. Toward the base end of the guide 232 is located a threaded section 236, which threads engage the inner threads 132 when the guide 232 is inserted into the receiver 130. The insertion guide 232 is dimensioned to fit within the socket 134. The rounded tip of the guide 232 helps provide an initial alignment of the open end of the receiver 130. As the guide 232 continues to move forward it aligns the tool 200 as it passes through the threads 132. When the guide 232 enters the socket 134, it fits snugly, and thus the interaction between the guide and the socket quickly and precisely aligns the tool 200 with the threaded member 116. When the inner threads 132 of the receiver 130 engage the threaded section 236 of the connector 214, the tool 200 and the threaded member 116 are already aligned and it would be difficult if not impossible to cross thread the threads. In certain embodiments, with approximately a one-half turn of the connector 214, the threads tighten and secure the threaded member 116 to the connector.

Figure 6:
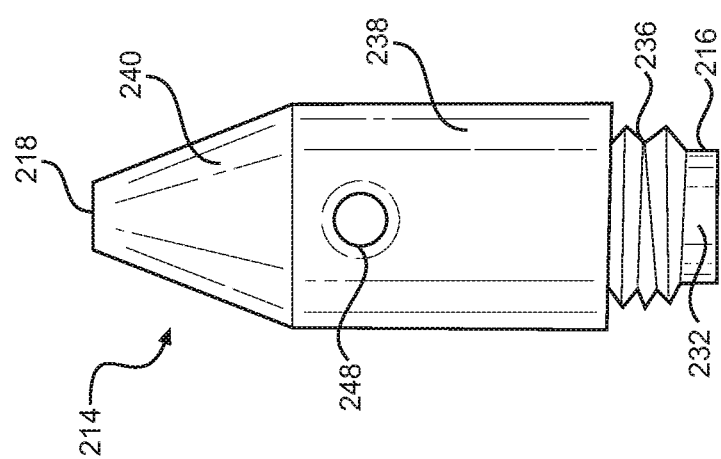
FIG. 6 is a front view illustrating a connector portion of the tool apparatus of FIG. 5 that connects a blind bolt to a flexible member portion of the tool.
Figure 10:
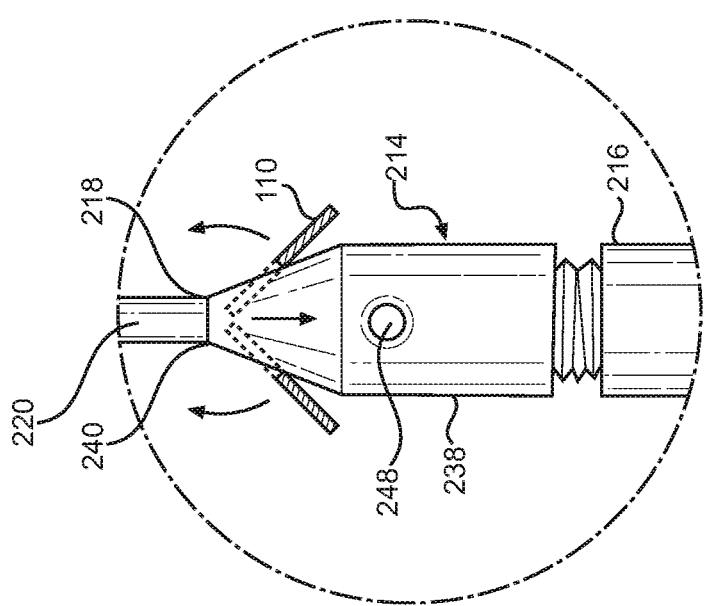
FIG. 10 illustrates the process of unfolding the folding washer with the assistance of a tapered section of the connector.

As shown best in FIGS. 6 and 10, the second end 218 of the connector 214 includes a cylindrical section 238 that transitions into a conical or tapered section 240 that is tapered away from the first end 216. The tapered section 240 of the connector may be either conical or rounded in shape and the first bore 244 is located at the center of the tapered section. The cylindrical section 238 is approximately the size of the center opening of the folding washer 110. As discussed further below, the tapered section 240 assists in beginning to unfold the washer 110 and the sizing of the cylindrical section assists the washer to completely unfold to the unfolded configuration. As shown best in FIG. 7, a first bore 244 is formed in the second end 218 of the connector 214, and extends through the center of the tapered section 240 and at least partially into the cylindrical section 238 along an axis formed between the first end 216 and the second end 218 of the connector. The first bore 244 is sized and configured to enable a portion of the flexible member 220 to be inserted into the bore. Once inserted, the flexible member 220 is, preferably, fixedly mounted therein. The flexible member 220 may be fixed, for example, by welding, press fitting, adhesives, and the like. However, in other embodiments, the flexible member 220 may be removably mounted to the connector 214. In the embodiment shown, a set screw 246 is threaded into a second threaded bore 248 that is formed between the first end 216 and the second end 218 of the connector 214 and that is in communication with the first bore 244. The second bore 248 is preferably located in the cylindrical section 238 of the connector 214 and oriented perpendicularly to the first bore 244. To mount the flexible member 220 to the connector 214, the flexible member is fed into the first bore 244 until it extends beyond the second bore 248. The set screw 246 is then threaded into the second bore 248 until it contacts and secures the flexible member 220 in the first bore 244. As such, following the procedure above, the flexible member 220 is mounted to the connector and extends away from the center of the rounded or cone-shaped tapered section 240.

Figure 9:
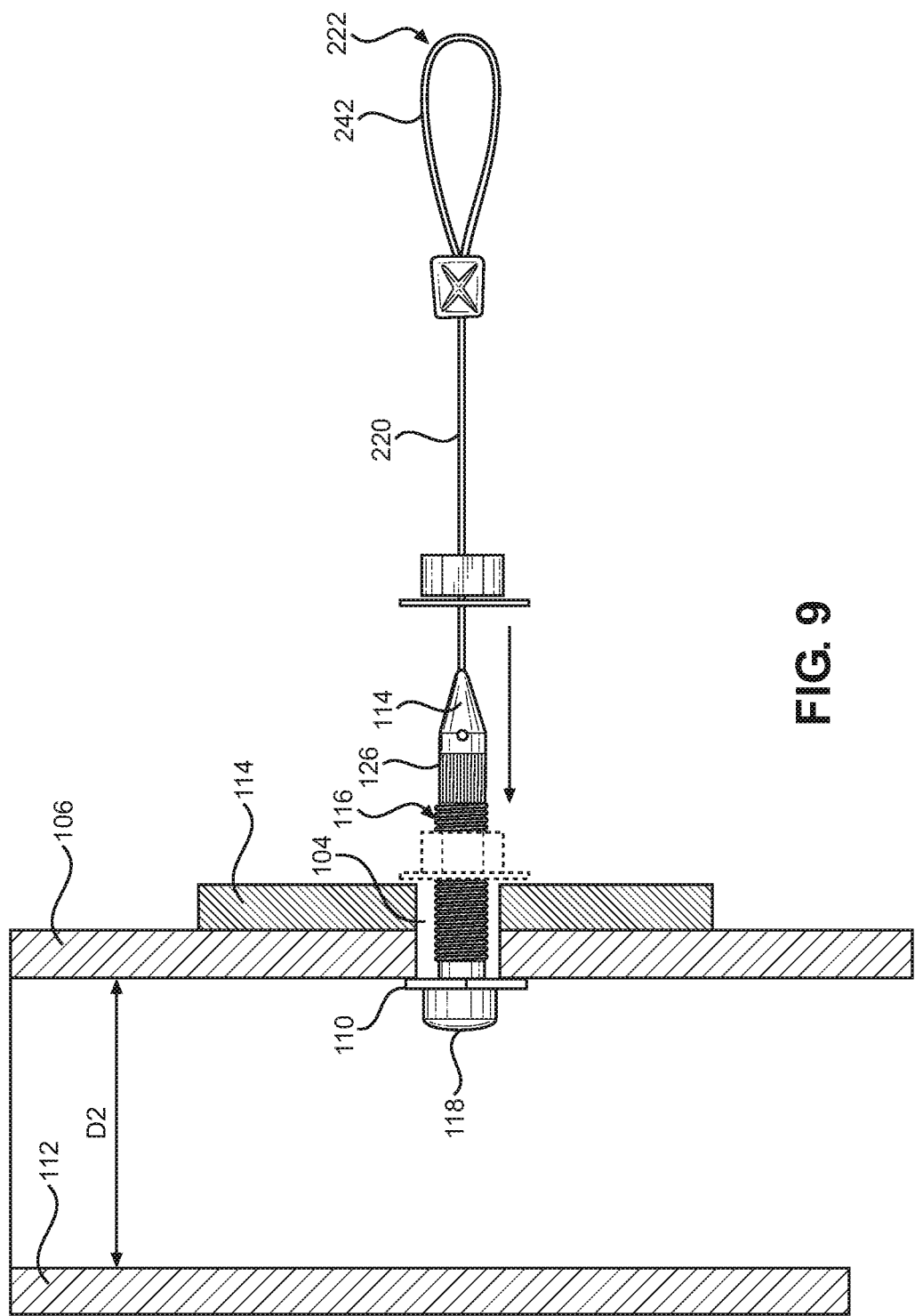

With reference now to FIGS. 8 and 9, the flexible member 220 is formed using a cable, such as a braided steel cable. The flexible member 220 is sized so that, when it is mounted to the threaded member 116 and the threaded member is located within a structure, an end 222 of the flexible member 220 extends out of a hole in the structure and may be grasped by a user. The end 222 of the flexible member 220 includes a loop 242 that may be grasped by the user when installing a threaded member 116. To further improve a user's grip, a handle may be removably mounted to the loop 242 formed at the end 222 of the flexible member 220. The handle may be simply inserted through the loop 242. Alternatively, a clip may be mounted to the handle and then then clip may be secured to the loop 242 of the flexible member 220. Also, preferably, the loop 242 is sized larger than the hole 104 in the structure 106 and reinforcement plate 114. The loop 242 is large enough and the flexible member 220 is rigid enough that, in the event of an accidental drop, the loop will contact the structure surrounding the hole and will prevent the end 222 of the flexible member from passing into the structure.

In addition to providing a place for a user to hold the flexible member 220 and for preventing the installation tool 200 from falling into structure after an accidental drop, the loop 242 may also assist in temporarily securing bolt components placed onto the threaded member 116 during the blind bolt installation process. As mentioned earlier, the bolt installation process requires several bolt components to be placed onto the threaded member 116 in a particular order. The folding washer 110 is placed onto the threaded member 116 first in order to secure the threaded member within the structure. Following the installation of the folding washer 110, a non-folding washer 136 and a nut 138 is installed. Additional optional components may also be installed, including, for example, additional washers, sleeves, springs, or nuts. The flexible member 220 may serve as a temporary storage location for these components that also keeps them in the correct installation order. The loop 242 prevents the components from fall off the end of the flexible member 220.

After the head 118 of the threaded member 116 is secured inside the structure and the tip 126 is pulled out of the hole, the connector 214 can be removed and then the bolt components may be placed onto the threaded member individually by hand sliding them over the tip. Alternatively, these components may be placed onto the flexible member 220 while the connector 214 is still connected to the tip 126 of the threaded member 116, which would expedite the installation process and improve accuracy of installation. In this regard, each of the bolt components includes an opening that is sized so that the components can slide along the flexible member 220, over the connector 214, and then onto the threaded member 116. The bolt components may be placed onto the flexible member 220 before the connector 214 is mounted to the threaded member 116. However, it generally simpler and quicker to mount the connector 214 to the threaded member 116 without any bolt components being located on the flexible member 220. Thus, it is preferable to mount the bolt components onto the flexible member 220 after the connector 214 is secured to the tip 126 of the threaded member 116. As such, the loop 242 of the flexible member 220 is designed to be reduced in size, such as by being compressed, so that the end 222 may be inserted through the opening in the bolt components. Once the bolt components are placed onto the flexible member 220, they may be quickly and accurately positioned on the threaded member 116. At the same time, the end 222 of the flexible member 220 may be pulled in order to keep the threaded member 116 correctly and securely located with its tip 126 extending out of the hole 104 of the structure 106.

FIGS. 8-10 illustrate the process for mounting the threaded member 116 to the structure 106. In FIG. 8, a structure 106, such as a cell phone tower or monopole tower, and a reinforcing plate 114 mounted to the exterior surface of the tower is provided. A hole 104 extends through the structure 106 and the reinforcement plate 114. An obstruction 112 is located within the structure 106. As such, the internal space of the structure 106 has a width of D2, which prevents a traditional rigid installation tool from being used to install a blind bolt. The tip 126 of the threaded member 116 is mounted to first end 216 of the connector 214. The flexible member 220 is mounted to the second end 218 of the connector 214. The head 118 of the threaded member 116 is inserted into the hole 104 formed through a structure 106 and a reinforcement plate 114. While the end 222 of the flexible member 220 is held outside of the structure 106, the threaded member 116 is pushed inside of the structure, where it hangs in a vertical position. The folding washer 110 is then positioned onto the flexible member 220 by compressing the loop 242 at the end 222 and then inserting the end through an opening in the folding washer. Releasing the end 222 of the flexible member 220 allows the loop 242 to return to its normal size so that the washer 110 is held on the flexible member by the loop. The folding washer 110 is then pushed through the hole 104, in a folded configuration, into the structure 106. The tapered end 240 of the connector 214 passes through the opening in the folding washer 110. The tapered surface and the cylindrical surface of the connector 214, plus gravity, cause the folding washer 110 to move from the folded configuration to an unfolded configuration and to be positioned against the head of the threaded member 116.

Once the folding washer 110 is unfolded and correctly located on the threaded member 116, the end 222 of the flexible member 220 is pulled. Pulling the end 222 of the flexible member 220 lifts the threaded member 116 towards the hole 104. Upon reaching the hole 104 or just prior to reaching the hole, the head 118 of the threaded member 116 begins to rotate outwards (as shown in FIG. 8) so that the tapered section 240 of the connector is pointed towards the hole. The tapered surface of the connector 214 assists in rotating the threaded member 116 so that it is pointed towards the hole, which orientation facilitates the process of pulling the tip 126 of the threaded member through the hole. As seen in FIG. 9, once the tip 126 of the threaded member 116 has been pulled through the hole 104, the folding washer 110 is located between the head 118 of the threaded member and the inner surface of the structure 106. This secures the head 118 of the threaded member 116 within the structure and the tip of the threaded member is pointed outwards through the hole. Additional bolt components, namely the non-folding washer 136 and the nut 138, may be positioned on the flexible member 220 can then slide along the flexible member, over the connector 214 and then onto the threaded member 116. The nut 138 may then be tightened by hand. Once the nut 138 is hand tightened, the tool 200 is quickly removed from the threaded member 116 and a hex key may be inserted into the hex socket 134 and used to apply a torque to the threaded member 116 while the nut 138 is tightened on the threaded member with a wrench. Once a sufficient force or torque has been applied to the nut 138, the hex key is removed from the hex socket 134 and the process is complete.

Figure 7:
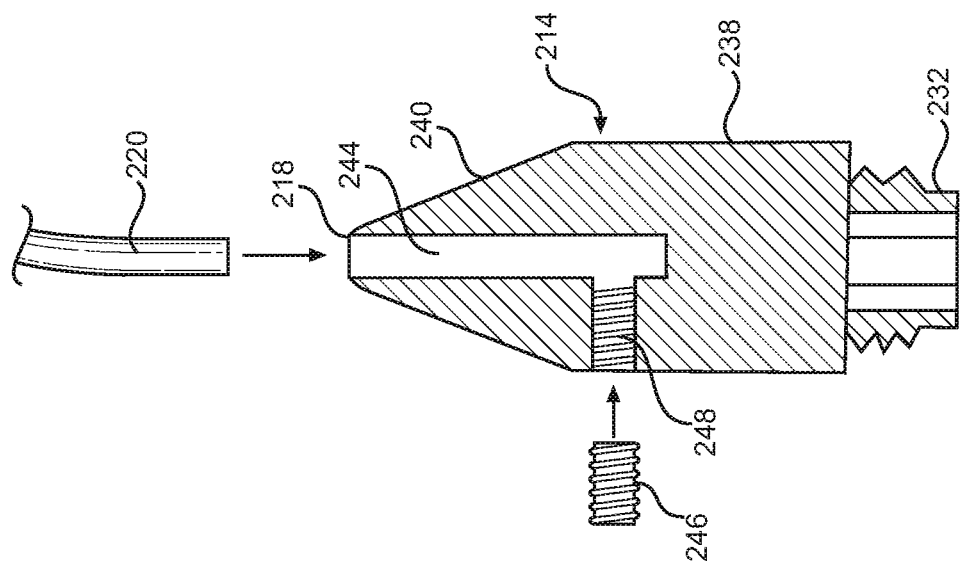
FIG. 7 is a cutaway view of the connector of FIG. 6 illustrating the insertion of a set screw and a flexible member portion of the tool into the connector portion.
Figure 11:
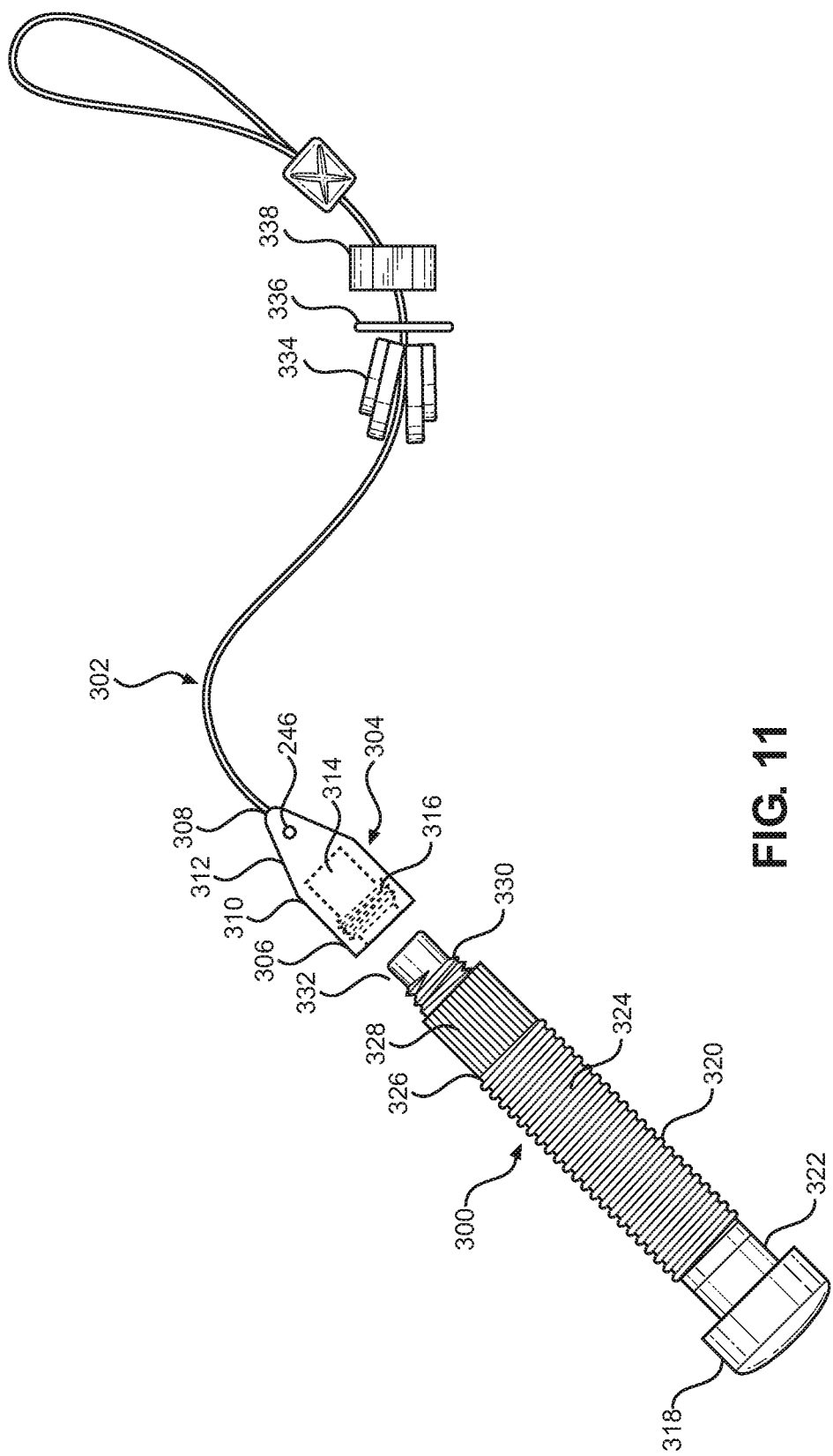
FIG. 11 illustrates a blind bolt and tool apparatus for use in inserting the blind bolt into a hole in a structure according to a second embodiment of the present disclosure.

An alternative embodiment of a threaded member 300 and a flexible tool apparatus 302 is provided in FIG. 11. As before, a folding washer 334, non-folding washer 336 and nut 338 are configured to engage threads of the threaded member 300. The tool apparatus 302 includes a connector 304 having a first end 306 and a second end 308. The connector 304 includes a cylindrical section 310 that transitions into a conical or tapered section 312 that is tapered away from the first end 306. A flexible member 302 is connected to the second end 308 of the connector 304 in the same way as described above. However, a receiver 314 is formed at the first end 306 of the connector 304 in place of the insertion guide 232 (FIG. 7). The receiver 314 extends into the cylindrical section 310 of the connector 304 and is provided with internal threads 316. The threaded member 300 includes a head 318, a shaft 320 extending away from the head, including a smooth section 322 located adjacent the head and a threaded section 324 disposed on at least a portion of the shaft, and a tip 326 opposite the head. Beyond the tip 326 of the threaded member is splined section 328, and beyond the splined section is another tip 330 having external threads 332. The tip 330 is configured to be inserted into the receiver 314 and the external threads 332 are configured to mesh with the internal threads 316 of the receiver in order to mount the threaded member 300 to the connector 304.

The process for installing the threaded member 300 is similar to the process of installing the previously-discussed threaded member 116. However, in this case, the splined section 328 makes this threaded member suitable for tightening using a tension control wrench instead of the hex wrench discussed previously. The splines located on the splined section 328 are configured to engage with an inner socket of a tension control wrench and an outer socket engages the nut 338. Thus, the final tightening of the nut 338 on the threaded member 300 may be accomplished using a tension control wrench, which includes both an inner socket which engages with the splined section 332 located adjacent the tip 326 of the threaded member and an outer socket which engages the nut 338 after it has been threaded onto the threaded member. A torque is applied to the nut 338 by the outer socket while the inner socket holds the splined section 328 stationary, or applies an opposite torque, thus tightening the nut on the threaded member. When a predetermined amount of torque is applied, the splined section 328 and threaded section 332 will shear away from the threaded member 300. In this manner, a plurality of blind bolts and nuts may be tightened to a more consistent and uniform torque.

In a variation of the above embodiment, the nut may be tightened on the blind bolt without breaking away the splined section 328. In this variation, a tension control wrench is used that slips when a predetermined amount of torque is applied between the inner socket and the outer socket. When the nut is tightened, the tension control wrench applies a torque to the nut using the outer socket and applies an opposite torque to the splined section 332 with the inner socket. The applied torque will increase until the predetermined amount of torque is applied between the inner and outer sockets. Then, the wrench will begin to slip and will not increase the amount of torque. Thus, a predetermined torque is applied to the nut, and assuming the predetermined amount of torque is less than the breakaway torque of the splined section, the splined section will not be sheared away by the tension control wrench. In this embodiment, the blind bolt could be removed by using the tension control wrench to apply opposite torques using the inner and outer sockets. Thus, theoretically, the blind bolt could be easily removed, inspected and reused or replaced. However, one advantage of the breakaway tip would be lost. When a blind bolt is observed with the tip broken away, an inspector can be assured that the proper torque was applied to the nut when the bolt was installed. If the tip is not broken away, an inspector loses that assurance.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A tool apparatus for use in connection with a hole in a structure, the hole extending from an accessible outer surface of the structure to an inner surface in an inaccessible area within the structure, the tool apparatus comprising:
    a blind bolt having a head, a shaft having a first end connected to the head and extending away from the head, threads disposed on at least a portion of the shaft, and a tip disposed on a second end of the shaft, wherein the head, tip, shaft, and threads are sized to pass through the hole such that the blind bolt may be inserted into the structure;
    an installation tool removably mounted to the blind bolt and for extending out of the hole when the blind bolt is located within the structure, the installation tool having:
        a connector having a first end configured to removably mount to the tip of the blind bolt and having a second end, the second end of the connector including a tapered section that is tapered away from the first end; and
        a flexible member having a proximate end and a distal end, the distal end of the flexible member being connected to the second end of the connector and the flexible member being sized to extend from the connector and out of the hole when the connector is mounted to the blind bolt and the blind bolt is located within the structure such that a user may grasp the proximate end of the flexible member, the flexible member being sufficiently flexible to extend through the hole and bend downwardly to suspend the blind bolt within the inaccessible area proximate to the inner surface and below the hole; and
    a folding washer operable to move from a folded configuration to an unfolded configuration, the folding washer having an opening such that the folding washer is configured to slide along the flexible member through the hole in the folded configuration, and wherein the tapered section of the connector engages the opening such that the folding washer is opened to the unfolded configuration as it slides past the connector to the head of the blind bolt.

2. The tool apparatus of claim 1 further comprising threads disposed on the tip of the blind bolt and threads disposed on the first end of the connector that are configured to mesh with the threads on the tip of the blind bolt to removably mount the connector to the blind bolt.

3. The tool apparatus of claim 2 wherein the first end of the connector has an internally-threaded receiver and the tip of the blind bolt is sized to fit within the receiver and has external threads configured to mesh with the internally-threaded receiver.

4. The tool apparatus of claim 3 further comprising a splined section disposed between the external threads on the tip of the blind bolt and the threads on the shaft of the blind bolt, wherein the splined section and the tip are configured to break away from the threaded shaft when a pre-set amount of torque is applied to the splined section.

5. The tool apparatus of claim 2 wherein the tip of the blind bolt has an internally-threaded bore and the first end of the connector has an externally-threaded section that is sized to fit within the bore such that the threads within the bore mesh with the threads of the connector.

6. The tool apparatus of claim 1 further comprising a loop formed in the end of the flexible member, wherein the loop is larger than the hole in the structure and the flexible member is sufficiently stiff that the loop is configured to contact the structure, to retain its shape and to prevent the end of the flexible member from passing into the structure via the hole.

7. The tool apparatus of claim 6 further comprising one or more bolt components, each bolt component having an opening, and wherein the loop may be reduced in size and inserted through the opening in the one or more bolt components and then increased in size to retain the one or more bolt components on the flexible member.

8. The tool apparatus of claim 1, wherein the tapered section of the connector is conical or rounded in shape.

9. The tool apparatus of claim 1 wherein a first bore is formed in the second end of the connector and extends at least partially into the connector along an axis formed between the first end and the second end thereof, and wherein a portion of the flexible member opposite the end of the flexible member is inserted into and fixedly mounted within the first bore.

10. The tool apparatus of claim 9 further comprising:
    a second threaded bore formed in the connector between the first and second ends and arranged and configured such that the second bore is in communication with the first bore; and
    a set screw threaded into the second bore and configured to contact the portion of the flexible member disposed in the first bore for securely fixing the flexible member within the connector.

11. The tool apparatus of claim 1 further comprising a handle removably mounted to the end of the flexible member, wherein the handle is larger than the hole in the structure and is configured to contact the structure surrounding the hole to prevent the end of the flexible member from passing into the structure via the hole.

12. The tool apparatus of claim 1 wherein the flexible member is sufficiently stiff to push the blind bolt through and beyond the hole.

* * * * *